(12) United States Patent
Li

(10) Patent No.: US 12,333,988 B2
(45) Date of Patent: Jun. 17, 2025

(54) DRIVING CIRCUIT, DRIVING METHOD, AND DISPLAY TERMINAL

(71) Applicant: Suzhou China Star Optoelectronics Technology Co., Ltd., Jiangsu (CN)

(72) Inventor: Wenfang Li, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/637,582

(22) PCT Filed: Jan. 13, 2022

(86) PCT No.: PCT/CN2022/071742
§ 371 (c)(1),
(2) Date: Jun. 23, 2023

(87) PCT Pub. No.: WO2023/130490
PCT Pub. Date: Jul. 13, 2023

(65) Prior Publication Data
US 2024/0046846 A1    Feb. 8, 2024

(30) Foreign Application Priority Data
Jan. 6, 2022 (CN) .......... 202210008066.X

(51) Int. Cl.
*G09G 3/20* (2006.01)
*G09G 3/00* (2006.01)

(52) U.S. Cl.
CPC ........... *G09G 3/2092* (2013.01); *G09G 3/006* (2013.01); *G09G 2330/06* (2013.01); *G09G 2330/12* (2013.01)

(58) Field of Classification Search
CPC ............... G09G 3/2092; G09G 3/006; G09G 2330/06; G09G 2330/12
See application file for complete search history.

(56) References Cited

U.S. PATENT DOCUMENTS

| | | | | |
|---|---|---|---|---|
| 7,671,575 B1* | 3/2010 | Suzuki | ............... | H05B 45/3725 323/284 |
| 2009/0273290 A1* | 11/2009 | Ziegenfuss | ............ | H05B 45/38 315/193 |
| 2012/0212142 A1* | 8/2012 | Ryu | ........................ | H05B 45/38 315/186 |
| 2013/0313974 A1* | 11/2013 | Fan | ........................ | H05B 47/24 315/200 R |

(Continued)

FOREIGN PATENT DOCUMENTS

| CN | 109087613 | 12/2018 |
|---|---|---|
| CN | 109597456 | 4/2019 |

(Continued)

*Primary Examiner* — David Tung

(57) ABSTRACT

A driving circuit, a driving method, and a display terminal are disclosed. A first output voltage is compared with a first starting voltage in a starting circuit in a first starting stage. If the first starting voltage is greater than the first output voltage, indicating that there is a risk of damaging a driving chip, a control unit turns off a control element to lower the first starting voltage in the starting circuit, to prevent the starting circuit outputting an excessively large voltage from damaging the driving chip in the first starting stage, so that the driving chip is protected.

16 Claims, 3 Drawing Sheets

(56) References Cited

U.S. PATENT DOCUMENTS

2014/0176014 A1\*  6/2014  Hu .................. G09G 3/3426
                                                    315/307

FOREIGN PATENT DOCUMENTS

| CN | 109616061 | 4/2019 |
| JP | 2006-133444 | 5/2006 |
| KR | 10-2011-0032500 | 3/2011 |

\* cited by examiner

DRIVING CIRCUIT, DRIVING METHOD, AND DISPLAY TERMINAL

RELATED APPLICATIONS

This application is a National Phase of PCT Patent Application No. PCT/CN2022/071742 having International filing date of Jan. 13, 2022, which claims the benefit of priority of China Patent Application No. 20221008066.X filed on Jan. 6, 2022. The contents of the above applications are all incorporated by reference as if fully set forth herein in their entirety.

FIELD AND BACKGROUND OF THE INVENTION

The present invention relates to the field of display technologies, and in particular, to a driving circuit, a driving method, and a display terminal.

Electro-static discharge (ESD) frequently occurs in daily lives. Therefore, an ESD test is usually performed on a display panel after the display panel is fabricated. To test the endurance of the display panel for some extreme situations, during the ESD test, a VAA current in a starting circuit is greater than a current required by the display panel for normal work, which may damage a driving chip, such as a chip on film (COF), causing some damage conditions of the COF. For example, the VAA current damages a ground resistor (GND, 15 ohms) in the COF during the ESD test. In a restarting process after the ESD test is completed, due to a relatively large resistance value, the COF may be on fire and burnt as a starting voltage in the starting circuit gradually increases.

SUMMARY OF THE INVENTION

Technical Problem

Embodiments of the present disclosure provide a driving circuit, a driving method, and a display terminal, to resolve the problem that a driving chip is on fire and burnt in a restarting process due to damage to the driving chip during an ESD test.

Technical Solution

The embodiments of the present disclosure provide a driving circuit, including a protection circuit and a starting circuit, wherein the protection circuit includes: a control element, including a control terminal, a first terminal and a second terminal, wherein the control element is electrically connected to the starting circuit by the first terminal to receive a starting voltage in the starting circuit; a control unit, configured to generate a control signal and generate an output voltage, wherein an output terminal of the control unit is electrically connected to the control terminal of the control element to transmit the control signal to the control element; a transmission circuit, wherein an input terminal of the transmission circuit is electrically connected to the control unit to transmit the output voltage; and at least one voltage comparison module, configured to compare the starting voltage with the output voltage and generate a comparison signal, wherein the voltage comparison module includes a first input terminal, a second input terminal, and an output terminal, the first input terminal of the voltage comparison module is electrically connected to the second terminal of the control element to receive the starting voltage, the second input terminal of the voltage comparison module is electrically connected to an output terminal of the transmission circuit to receive the output voltage, and the output terminal of the voltage comparison module is electrically connected to an input terminal of the control unit to output the comparison signal to the control unit.

Optionally, the second terminal of the control element is connected in series to a sensing element, and one terminal of the sensing element away from the control element is grounded.

Optionally, the control unit includes a control module configured to generate the control signal and a starting module configured to generate the output voltage; an input terminal of the control module is electrically connected to the output terminal of the voltage comparison module, and an output terminal of the control module is electrically connected to the control terminal of the control element; and an input terminal of the starting module is electrically connected to the control module, and the input terminal of the transmission circuit is electrically connected to an output terminal of the starting module to transmit the output voltage.

Optionally, there are two voltage comparison modules: a first voltage comparison module and a second voltage comparison module; a first input terminal of the second voltage comparison module is electrically connected to the output terminal of the starting module to receive the output voltage, and a second input terminal of the second voltage comparison module is electrically connected to a threshold voltage module to receive a threshold voltage; and a first input terminal of the first voltage comparison module is electrically connected to the second terminal of the control element to receive the starting voltage, a second input terminal of the first voltage comparison module is electrically connected to an output terminal of the second voltage comparison module by the transmission circuit, and an output terminal of the first voltage comparison module is electrically connected to the input terminal of the control module.

Optionally, the transmission circuit includes a first branch circuit and a second branch circuit, an input terminal of the first branch circuit and an input terminal of the second branch circuit are electrically connected to an output terminal of the second voltage comparison module respectively; if the output voltage of the starting module is less than the threshold voltage, the second input terminal of the first voltage comparison module is electrically connected to the output terminal of the second voltage comparison module by the first branch circuit to receive a first branch voltage; and if the output voltage of the starting module is greater than the threshold voltage, the second input terminal of the first voltage comparison module is electrically connected to the output terminal of the second voltage comparison module by the second branch circuit to receive a second branch voltage.

Optionally, the first branch circuit includes a first switch, a first current source, and a first resistor connected in series, and one terminal of the first resistor away from the first current source is grounded; and the second branch circuit includes a second switch, a second current source, and a second resistor connected in series, and one terminal of the second resistor away from the second current source is grounded.

The embodiments of the present disclosure further provide a driving method, including:

in a first starting stage, outputting, by a control unit in the foregoing driving circuit, a first output voltage to a voltage comparison module, and outputting, by a starting circuit, a first starting voltage to the voltage comparison module through a control element;

comparing, by the voltage comparison module, the first output voltage with the first starting voltage;

if the first starting voltage is greater than the first output voltage, outputting, by the voltage comparison module, a first comparison signal to the control unit, and disconnecting, by the control unit, an electrical connection between the control element and the starting circuit according to the first comparison signal; and in a second starting stage, outputting, by the control unit, a second output voltage to the voltage comparison module, wherein the second output voltage is greater than the first output voltage, and the second output voltage is less than a second starting voltage in the starting circuit, outputting, by the voltage comparison module, a second comparison signal to the control unit, and maintaining, by the control unit, the electrical connection between the control element and the starting circuit according to the second comparison signal.

Optionally, the driving method further includes: outputting the first output voltage to a second input terminal of the voltage comparison module if an output voltage outputted by the control unit is less than a threshold voltage; and outputting the second output voltage to the second input terminal of the voltage comparison module if the output voltage outputted by the control unit is greater than the threshold voltage.

Optionally, a first voltage comparison module compares the first output voltage with the first starting voltage; the first voltage comparison module compares the second output voltage with the second starting voltage; and a second voltage comparison module compares the output voltage with the threshold voltage.

The embodiments of the present disclosure further provide a display terminal, including a terminal body, a display panel and the foregoing driving circuit, wherein the driving circuit includes a protection circuit and a starting circuit, the protection circuit is connected to the starting circuit by a control element, and an output terminal of the starting circuit is electrically connected to the display panel by a driving chip.

Beneficial Effects

The present disclosure has the following beneficial effects: The driving circuit compares a first output voltage with a first starting voltage in the starting circuit in the first starting stage. If the first starting voltage is greater than the first output voltage, indicating that a load current in the starting circuit at the moment is relatively large, the voltage is relatively high, and there is a risk of damaging the driving chip, the control unit turns off the control element to lower the first starting voltage in the starting circuit, to prevent the starting circuit outputting an excessively large voltage from damaging the driving chip electrically connected to the output terminal of the starting circuit in the first starting stage, so that the driving chip is protected.

BRIEF DESCRIPTION OF THE SEVERAL VIEWS OF THE DRAWINGS

The following describes specific implementations of the present invention in detail with reference to the accompanying drawings, so as to make the technical solutions and other beneficial effects of the present invention obvious.

The reference signs of components in the figures are as follows:

1, 1': driving circuit; 100: protection circuit; 110: control unit; 111: control module; 112: starting module; 120, 120': voltage comparison module; 121: first voltage comparison module; 122: second voltage comparison module; 130, 130': transmission circuit; 131: first branch circuit; 132: second branch circuit; 140: threshold voltage module; 200: starting circuit; 210: filter module;

2: display panel; 21: driving chip.

DESCRIPTION OF SPECIFIC EMBODIMENTS OF THE INVENTION

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person skilled in the art based on the embodiments of the present invention without creative efforts shall fall within the protection scope of the present invention.

The driving circuit provided in the present disclosure compares a first output voltage with a first starting voltage in the starting circuit in the first starting stage. If the first starting voltage is greater than the first output voltage, indicating that a load current in the starting circuit at the moment is relatively large, the voltage is relatively high, and there is a risk of damaging the driving chip, the control unit turns off the control element to lower the first starting voltage in the starting circuit, to prevent the starting circuit outputting an excessively large voltage from damaging the driving chip electrically connected to the output terminal of the starting circuit in the first starting stage, so that the driving chip is protected. In a typical application, the driving circuit can protect a driving chip of a display panel in a starting process to prevent the starting circuit from burning the driving chip due to an excessively large voltage in a restarting process after an ESD test. The driving circuit may be applied to products or components with display functions such as a display terminal, for example, a digital camera, a video camera, a smart phone, an on-vehicle terminal, an ultrathin laptop computer, a tablet computer, and a flexible display. The display terminal includes a terminal body, a display panel, and a driving circuit. The driving circuit includes a protection circuit and a starting circuit. The protection circuit is connected to the starting circuit by a control element. An output terminal of the starting circuit is electrically connected to the display panel by the driving chip. The terminal body is integrated with the display panel. The terminal body is operated through the display panel, and information of the terminal body is displayed by the display panel.

Figure 1:
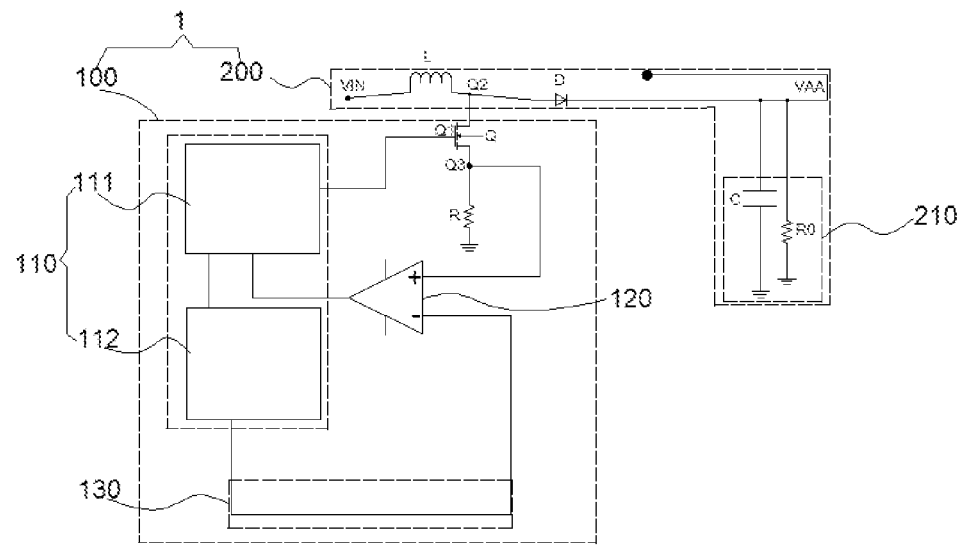
FIG. 1 is a circuit diagram of a driving circuit according to an exemplary embodiment of the present invention.

In an embodiment of the present invention, referring to FIG. 1, a driving circuit 1 includes a protection circuit 100 and a starting circuit 200. The protection circuit 100 includes a control element Q, a control unit 110, a voltage comparison module 120, and a transmission circuit 130. The control element Q includes a control terminal Q1, a first terminal Q2, and a second terminal Q3. The protection circuit 100 is connected to the starting circuit 200 by the first terminal Q2 of the control element Q, and is electrically connected to the starting circuit 200.

The control unit 110 includes a control module 111 and a starting module 112. An output terminal of the control module 111 is electrically connected to the control terminal Q1 of the control element Q to output an on/off control signal to the control element Q for controlling off or on of the control element Q. Another output terminal of the control module 111 is electrically connected to an input terminal of the starting module 112. The output terminal of the control module 111 is a signal output terminal configured to output a starting signal to the starting module 112. The starting signal includes a first starting signal and a second starting signal. According to the starting signal outputted by the control module 111, the starting module 112 outputs two output voltages: a first output voltage corresponding to the first starting signal and a second output voltage corresponding to the second starting signal.

If the control module 111 outputs a high level to the control terminal Q1 of the control element Q, then the control element Q is turned on, and the high level is transmitted to the starting circuit 200. If the control module 111 stops outputting the high level to the control terminal Q1 of the control element Q, then the control element Q is turned off.

In the present embodiment, the voltage comparison module 120 is a comparator. A first input terminal of the voltage comparison module 120 corresponds to a positive input terminal (+) of the comparator. A second input terminal of the voltage comparison module 120 corresponds to a negative input terminal (−) of the comparator. An output terminal of the voltage comparison module 120 corresponds to an output terminal of the comparator. In other implementations, other devices with a voltage comparison function may alternatively be used.

The output terminal of the voltage comparison module 120 is electrically connected to an input terminal of the control module 111. The second terminal Q3 of the control element Q is electrically connected to the first input terminal of the voltage comparison module 120. An output terminal of the starting module 112 is electrically connected to the second input terminal of the voltage comparison module 120 by the transmission circuit 130.

A working principle of the voltage comparison module 120 is that: when a value of a voltage inputted into the first input terminal is greater than a value of a voltage inputted into the second input terminal, the output terminal outputs a high level signal. When the value of the voltage inputted into the first input terminal is less than the value of the voltage inputted into the second input terminal, the output terminal outputs a second comparison signal. In the present embodiment, the second comparison signal is a low level signal. Specifically, in the present embodiment, when a value of a voltage outputted by the second terminal Q3 of the control element Q to the first input terminal of the voltage comparison module 120 is greater than a value of an output voltage outputted by the transmission circuit 130 to the second input terminal of the voltage comparison module 120, the output terminal of the voltage comparison module 120 outputs a high level. When the value of the voltage outputted by the second terminal Q3 of the control element Q to the first input terminal of the voltage comparison module 120 is less than the value of the output voltage outputted by the transmission circuit 130 to the second input terminal of the voltage comparison module 120, the output terminal of the voltage comparison module 120 outputs a low level. In another implementation, the second terminal Q3 of the control element Q is connected in series to a sensing element. The sensing element is configured to sense a magnitude of a starting current in the starting circuit 200. One terminal of the sensing element is electrically connected to the second terminal Q3 of the control element Q, and another terminal of the sensing element is grounded. As shown in FIG. 1, the sensing element is a sensing resistor R.

In another implementation, the starting circuit 200 further includes a filter module 210. The filter module 210 includes a capacitor C and a filter resistor R0. One terminal of the capacitor C is connected to the output terminal of the starting circuit 200, and another terminal of the capacitor C is grounded. One terminal of the filter resistor R0 is connected to the output terminal of the starting circuit 200, and another terminal of the filter resistor R0 is grounded.

The control element Q is a MOS transistor, that is, a metal-oxide-semiconductor field-effect transistor (MOSFET). Specifically, in the present embodiment, the MOS transistor is an N-type MOS transistor, the control terminal Q1 is a gate, the first terminal Q2 is a source, and the second terminal Q3 is a drain.

Figure 1A:
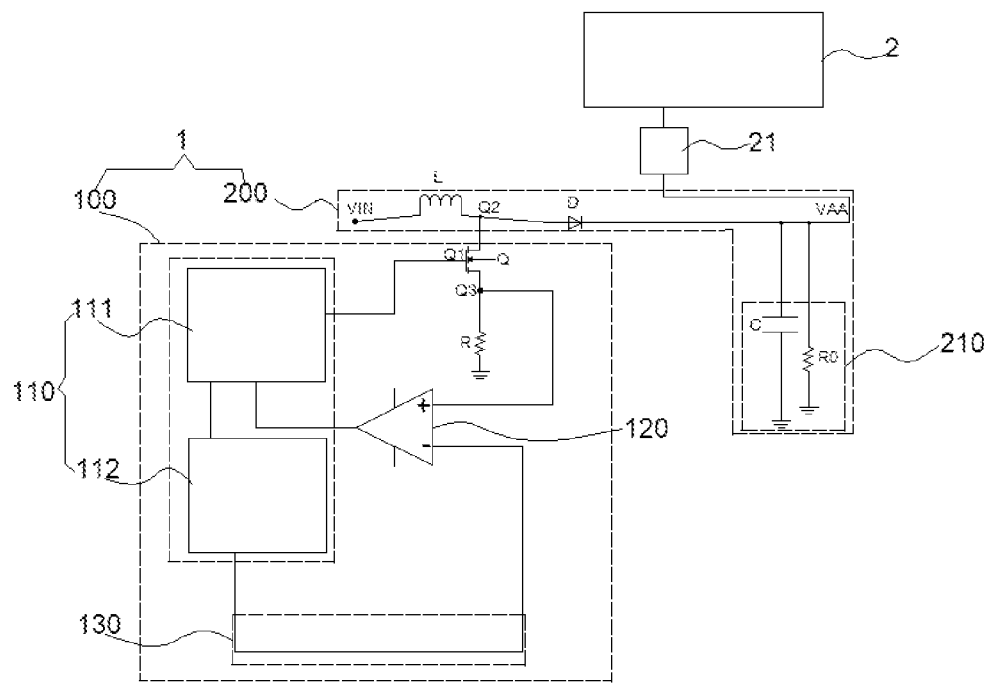
FIG. 1a is a circuit diagram of a connection between a driving circuit and a display panel according to an exemplary embodiment of the present invention.

In use, referring to FIG. 1a, the protection circuit 100 in the driving circuit 1 is connected to the starting circuit 200 by the first terminal Q2 of the control element Q. The starting circuit 200 includes an inductor L and a diode D. The inductor L, the first terminal Q2 of the control element Q, and the diode D are connected in series. An input voltage VIN is connected into an input terminal of the starting circuit 200. The input voltage VIN is boosted to a starting voltage VAA by the inductor L, the first terminal Q2 of the control element Q, and the diode D. The output terminal of the starting circuit 200 is electrically connected to the input terminal of the driving chip 21. The output terminal of the driving chip 21 is electrically connected to the display panel 2. The driving chip 21 drives the display panel 2 to display images. The driving chip 21 is a chip on film (COF) chip.

When the input voltage VIN is loaded, the inductor L stores energy and smoothes the current.

A start-up process of the display panel 2 includes a first starting stage (that is, a soft starting stage) and a second starting stage (that is, a normal starting stage) after the first starting stage ends. Correspondingly, the starting voltage in the starting circuit 200 includes a first starting voltage of the first starting stage and a second starting voltage of the second starting stage. The first starting current is less than the second starting current, the first starting voltage is less than the second starting voltage, and the first starting voltage is generally 70% of the second starting voltage.

Figure 2:
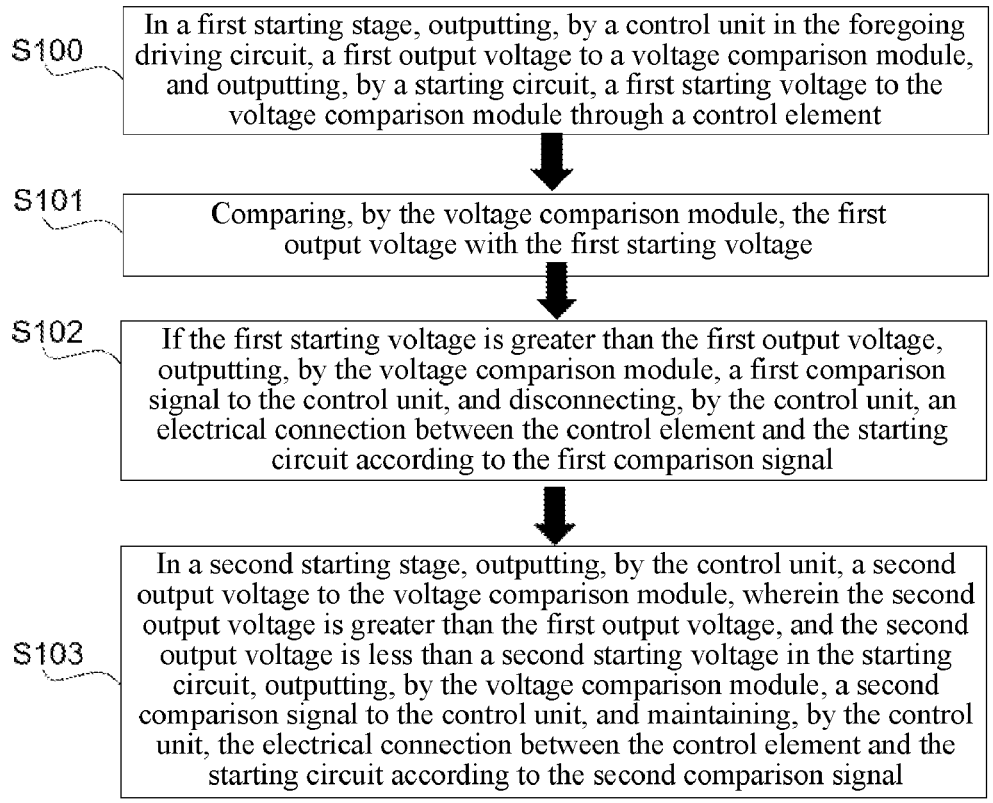
FIG. 2 is a flowchart of a driving method according to an exemplary embodiment of the present invention.

Referring to FIG. 2, a driving method implemented by using the driving circuit 1 provided by the present embodiment includes steps as follows.

The protection circuit 100 in the driving circuit 1 is connected to the starting circuit 200 by the first terminal Q2 of the control element Q (specifically, the first terminal Q2 is connected to the starting circuit 200 located between the inductor L and the diode D), and the output terminal of the starting circuit 200 is electrically connected to the driving chip 21. In addition, in the present embodiment, the first starting current required by the starting circuit 200 in the first starting stage is set to 50% of the second starting current required in the starting circuit 200 in the second starting stage. Specifically, in the present embodiment, if the first starting current required in the starting circuit 200 in the first starting stage is 2 A, and the corresponding first starting voltage is 0.1 V, then the second starting current required in the starting circuit 200 in the second starting stage is 4 A, and the corresponding second starting voltage is 0.2 V. If a load current in the starting circuit 200 in the first starting stage exceeds the first starting current, there is a risk of damaging the driving chip 21.

S100: In a first starting stage, receiving, by an input terminal of a starting circuit 200, an input voltage VIN, wherein the input voltage VIN at the moment is a first starting voltage, sending, by a control module 111, a first starting signal to a starting module 112, receiving, by the starting module 112, the first starting signal and outputting a first output voltage, transmitting, by a transmission circuit 130, the first output voltage to a second input terminal of a voltage comparison module 120, and transmitting the first starting voltage in the starting circuit 200 to a first input terminal of the voltage comparison module 120 through a second terminal Q3 of a control element Q.

S101: Comparing, by the voltage comparison module 120, the first output voltage of the transmission circuit 130 with the first starting voltage in the starting circuit 200.

S102: If the first starting voltage in the starting circuit 200 is greater than the first output voltage of the transmission circuit 130, indicating that a load current of the starting circuit 200 in the first starting stage is excessively large and exceeds the first starting current, and there is a risk of damaging a driving chip 21, because the first starting voltage outputted to the first input terminal of the voltage comparison module 120 is greater than the first output voltage outputted to the second input terminal of the voltage comparison module 120, outputting, by an output terminal of the voltage comparison module 120, a first comparison signal (a high level signal) to the control module 111, and because control module 111 outputs the first starting signal to the starting module 112, stopping, by the control module 111 according to the first comparison signal, outputting a high level to a control terminal Q1 of the control element Q, and turning off the control element Q, wherein because the control element Q is connected to the starting circuit 200 by a first terminal Q2, the turn-off of the control element Q can lower the first starting voltage in the starting circuit 200, reduce the load current, protect the driving chip 21 connected to the output terminal of the starting circuit 200, and prevent the driving chip 21 from being burnt due to an excessively high first starting current. Specifically, using an example in which a voltage value of the first output voltage is 0.1 V, when the first starting voltage exceeds 0.1 V (that is, when a voltage in a sensing resistor R exceeds 0.1 V), indicating that a load current in the starting circuit 200 at the moment exceeds 2 A (exceeding the first starting current), and there is a risk of damaging the driving chip 21, then the control module 111 stops outputting the high level to the starting circuit 200, turns off the control element Q to lower the first starting voltage in the starting circuit 200, and reduce the load current in the starting circuit 200.

If the starting voltage of the starting circuit 200 is less than or equal to the first output voltage of the transmission circuit 130, indicating that the first starting voltage in the starting circuit 200 falls within a safe range, the voltage comparison module 120 outputs a low level signal to the control module 111, the control module 111 maintains an electrical connection between the control element Q and the starting circuit 200 according to the low level signal, and the starting circuit 200 normally performs the first starting process.

To ensure the safety of the driving chip 21, a protection switch (not shown in the figure) may be disposed in the starting circuit 200. The protection switch is disposed between the diode D and the output terminal of the starting circuit 200. The protection switch is electrically connected to the control module 111. The protection switch and the control element Q are linked by the control element. When the control element Q is turned off, the protection switch is turned off accordingly, and the starting circuit 200 is disconnected to protect the driving chip 21. In other implementations, the protection switch and the control element Q are electrically connected to the control module 111 respectively, to implement the independent control of the protection switch and the control element Q by the control module 111. Specifically, the protection switch is a MOS transistor, that is, a metal-oxide-semiconductor field-effect transistor (MOSFET). Specifically, in the present embodiment, the MOS transistor is an N-type MOS transistor, the control terminal (gate) of the protection switch is electrically connected to the control module 111, the first terminal of the protection switch is a source, the second terminal of the protection switch is a drain, and the diode D, the first terminal of the protection switch, the second terminal of the protection switch and the output terminal of the starting circuit 200 are connected in sequence.

S103: After the first starting stage ends, entering a second starting stage, outputting, by the control module 111, a second starting signal to the starting module 112, and outputting, by the starting module 112, a second output voltage, wherein the second output voltage is greater than the first output voltage, and the second output voltage is less than the second starting voltage (usually, 12 V) in the starting circuit 200. Because a first starting voltage required by the first starting stage is less than a second starting voltage required by the second starting stage, the second output voltage outputted by the starting module 112 is greater than the first output voltage. In the present embodiment, the voltage value of the first output voltage is limited to 50% or less than 50% of a voltage value of the second output voltage. Specifically, the voltage value of the first output voltage is 0.1 V, and the voltage value of the second output voltage is 0.2 V.

In the second starting stage, a second output voltage is transmitted to a second input terminal of the voltage comparison module 120 by the transmission circuit 130. The second starting voltage transmitted by the starting circuit 200 to the first input terminal of the voltage comparison module 120 through the control element Q is greater than the second output voltage. An output terminal of the voltage comparison module 120 outputs a second comparison signal (a high level signal). The control module 111 outputs a high level to the control terminal Q1 of the control element Q according to the second comparison signal, and turns on the control element Q. The high level is transmitted into the starting circuit 200 through the first terminal Q2 of the control element Q. Because the voltage value of the second output voltage is twice the voltage value of the first output voltage, compared with the first starting stage, the first starting current (2 A) in the starting circuit 200 can be doubled to obtain the second starting current (4 A) without affecting the second starting voltage required by the second starting stage of the display panel 2.

In the second starting stage, the starting circuit 200 provides the second starting voltage to the driving chip 21, and the driving chip 21 drives the display panel 2 to display images, thereby completing the start-up process of the display panel 2.

Figure 3:
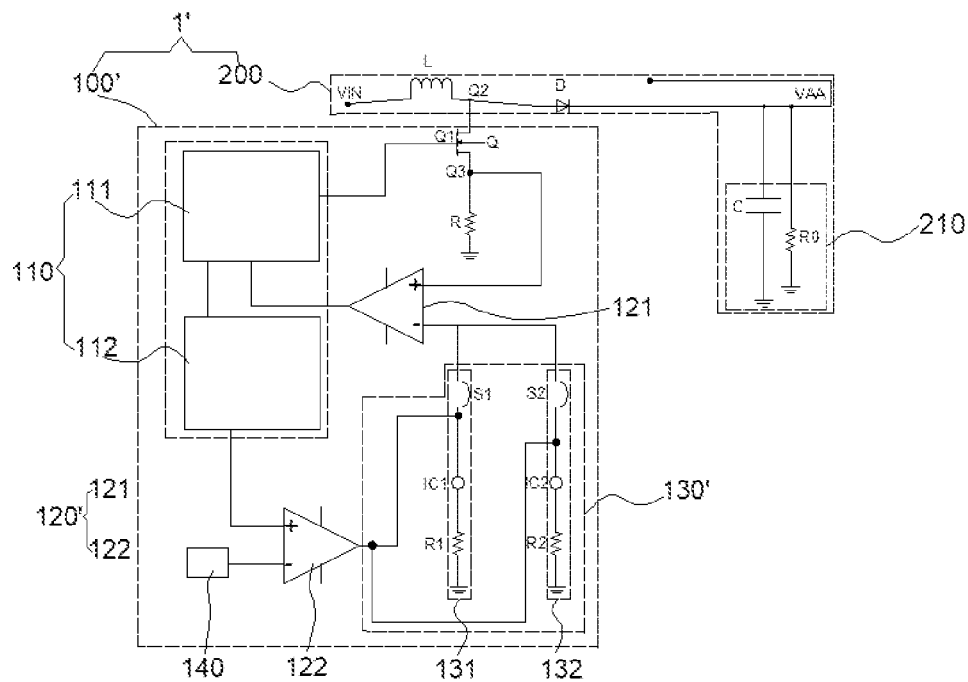
FIG. 3 is a circuit diagram of a driving circuit according to another exemplary embodiment of the present invention.

In another implementation, referring to FIG. 3, the driving circuit 1' includes a protection circuit 100' and a starting circuit 200. The protection circuit 100' includes a control element Q, a control unit 110, a voltage comparison module 120', a transmission circuit 130', and a threshold voltage module 140.

There are two voltage comparison modules 120': a first voltage comparison module 121 and a second voltage comparison module 122. In the present embodiment, the first voltage comparison module 121 and the second voltage comparison module 122 are both comparators. A first input terminal of the first voltage comparison module 121 corresponds to a positive input terminal (+) of the comparator. A second input terminal of the first voltage comparison module 121 corresponds to a negative input terminal (−) of the comparator. An output terminal of the first voltage comparison module 121 corresponds to an output terminal of the comparator. A first input terminal of the second voltage comparison module 122 corresponds to a positive input terminal (+) of the comparator. A second input terminal of the second voltage comparison module 122 corresponds to a negative input terminal (−) of the comparator. An output terminal of the second voltage comparison module 122 corresponds to an output terminal of the comparator. In other implementations, other devices with a voltage comparison function may alternatively be used as the first voltage comparison module 121 and the second voltage comparison module 122.

The first input terminal of the first voltage comparison module 121 is electrically connected to the second terminal Q3 of the control element Q. The output terminal of the first voltage comparison module 121 is electrically connected to the input terminal of the control module 111. The first input terminal of the second voltage comparison module 122 is electrically connected to the output terminal of the starting module 112. The second input terminal of the second voltage comparison module 122 is electrically connected to the threshold voltage module 140. The output terminal of the second voltage comparison module 122 is electrically connected to the input terminal of the transmission circuit 130'.

The transmission circuit 130' includes a first branch circuit 131 and a second branch circuit 132 connected in parallel. An input terminal of the first branch circuit 131 and an input terminal of the second branch circuit 132 are electrically connected to the output terminal of the second voltage comparison module 122 respectively. An output terminal of the first branch circuit 131 and an output terminal of the second branch circuit 132 are electrically connected to the second input terminal of the first voltage comparison module 121 respectively.

The first branch circuit 131 includes a first switch S1, a first current source IC1, and a first resistor R1 connected in series. The first switch S1 is configured to control on or off of the first branch circuit 131. The output terminal of the second voltage comparison module 122 is electrically connected to a line located between the first switch S1 and the first current source IC1. One terminal of the first resistor R1 away from the first current source IC1 is grounded. The second branch circuit 132 includes a second switch S2, a second current source IC2, and a second resistor R2 connected in series. The second switch S2 is configured to control on or off of the second branch circuit 132. The output terminal of the second voltage comparison module 122 is electrically connected to a line located between the second switch S2 and the second current source IC2. One terminal of the second resistor R2 away from the second current source IC2 is grounded.

In the present embodiment, a voltage value of a first branch voltage of the first branch circuit 131 is less than a voltage value of a second branch voltage of the second branch circuit 132. For example, if R1 and R2 are both 0.1 ohms resistors, IC1 is a 1 A current source, and IC2 is a 2 A current source, then the voltage value of the first branch voltage of the first branch circuit 131 is 0.1 V, and the voltage value of the second branch voltage of the second branch circuit 132 is 0.2 V. The threshold voltage module 140 outputs the threshold voltage to the second input terminal of the second voltage comparison module 122. In the present embodiment, the threshold voltage is 70% of the voltage value of the second starting voltage of the starting circuit 200 in the second starting stage. In other implementations, the threshold voltage may be adjusted according to actually requirements. For example, the threshold voltage is 60% to 80% of the voltage value of the starting voltage of the starting circuit in the normal work mode. The voltage value of the first output voltage outputted by the starting module 112 is less than a voltage value of the threshold voltage. The voltage value of the second output voltage outputted by the starting module 112 is greater than the voltage value of the threshold voltage.

Figure 3A:
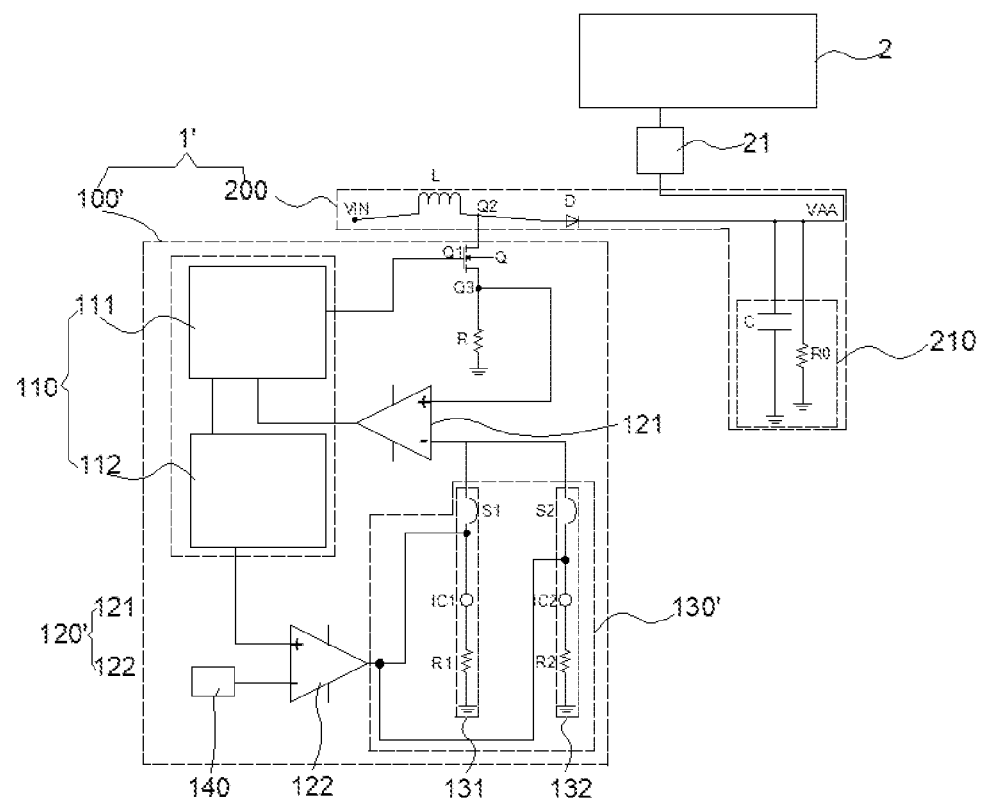
FIG. 3a is a circuit diagram of a connection between a driving circuit and a display panel according to another exemplary embodiment of the present invention.

Referring to FIG. 3a, a circuit driving method implemented by using the driving circuit 1' provided by the present embodiment includes steps as follows.

The protection circuit 100' in the driving circuit 1' is connected to the starting circuit 200 by the first terminal Q2 of the control element Q (specifically, the first terminal Q2 is connected to the starting circuit 200 located between the inductor L and the diode D), and the output terminal of the starting circuit 200 is electrically connected to the driving chip 21. In the present embodiment, the first starting current required by the starting circuit 200 in the first starting stage is set to 50% of the second starting current required in the starting circuit 200 in the second starting stage. In other implementations, the first starting current may be set to 40% to 60% of the second starting current according to requirements. Specifically, in the present embodiment, if the first starting current required in the starting circuit 200 in the first starting stage is 2 A, then the second starting current required in the starting circuit 200 in the second starting stage is 4 A. If a load current in the starting circuit 200 of the first starting stage exceeds the first starting current, there is a risk of damaging the driving chip 21.

S100a: In a first starting stage, sending, by a control module 111, a first starting signal to a starting module 112, receiving, by the starting module 112, the first starting signal and outputting a first output voltage, inputting the first output voltage into a first input terminal of a second voltage comparison module 122, because the first output voltage is less than a threshold voltage inputted into a second input terminal of the second voltage comparison module 122, outputting, by an output terminal of the second voltage comparison module 122, a low level signal, with reference to that the voltage value of the first branch circuit 131 is less than the voltage value of the second branch circuit 132, turning on the first branch circuit 131 of the transmission circuit 130' according to the low level signal outputted by the second voltage comparison module 122 without turning on the second branch circuit 132, and outputting, by the output terminal of the first branch circuit 131, the first branch voltage (0.1 V) to the second input terminal of the first voltage comparison module 121.

S101a: Comparing, by the first voltage comparison module 121, the first branch voltage with the first starting voltage transmitted by the starting circuit 200 to the first input terminal of the first voltage comparison module 121 through the control element Q.

S102a: If the first starting voltage is greater than the first branch voltage, indicating that a load current in the starting circuit 200 is excessively large and exceeds the first starting current, and there is a risk of damaging the driving chip 21, because the starting voltage outputted to the first input terminal of the first voltage comparison module 121 is greater than the first branch voltage outputted to the second input terminal of the first voltage comparison module 121, outputting, by an output terminal of the first voltage comparison module 121, a first comparison signal (a high level signal) to the control module 111, and because the control module 111 outputs the first starting signal to the starting module 112, stopping, by the control module 111 according to the first comparison signal, outputting a high level to a control terminal Q1 of a control element Q, and turning off the control element Q to lower the first starting voltage in the starting circuit 200, reduce the load current in the starting circuit 200, protect the driving chip 21 electrically connected to the output terminal of the starting circuit 200, and prevent the driving chip 21 from being burnt due to an excessively high load current exceeding the first starting current. Specifically, using an example in which a voltage value of the first output voltage is 0.1 V, when the starting voltage exceeds 0.1 V (that is, when a voltage in a sensing resistor R exceeds 0.1 V), indicating that a load current in the starting circuit 200 exceeds 2 A, that is, there is a risk of damaging the driving chip 21, then the outputting a high level to the starting circuit 200 is stopped, and the control module 111 turns off the control element Q to lower the voltage in the starting circuit 200, and reduce the load current in the starting circuit 200.

If the first starting voltage of the starting circuit 200 is less than or equal to the first branch voltage of the transmission circuit 130', indicating that the load current in the starting circuit 200 falls within a safe range, the first voltage comparison module 121 outputs a low level signal to the control module 111, the control module 111 maintains an electrical connection between the control element Q and the starting circuit 200 according to the low level signal, and the starting circuit 200 normally performs the first starting process.

S103a: After the first starting stage ends, entering a second starting stage, outputting, by the control module 111, a second starting signal to the starting module 112, outputting, by the starting module 112, the second output voltage to the first input terminal of the second voltage comparison module 122, because the second output voltage is greater than the threshold voltage inputted into the second input terminal of the second voltage comparison module 122, outputting, by the output terminal of the second voltage comparison module 122, the high level, with reference to that the voltage value of the second branch circuit 132 is greater than the voltage value of the first branch circuit 131, turning on the second branch circuit 132 without turning on the first branch circuit 131, and outputting, by the output terminal of the second branch circuit 132, the second branch voltage to the second input terminal of the first voltage comparison module 121. Because a first starting voltage required by the first starting stage is less than a second starting voltage required by the second starting stage, the second output voltage outputted by the starting module 112 is greater than the first output voltage. In the present embodiment, the voltage value of the first output voltage is limited to 50% or less than 50% of a voltage value of the second output voltage. Specifically, the voltage value of the first output voltage is 0.1 V, and the voltage value of the second output voltage is 0.2 V.

In the second starting stage, the second branch voltage is inputted into the second input terminal of the first voltage comparison module 121. The second starting voltage outputted to the first input terminal of the first voltage comparison module 121 is greater than the second branch voltage (0.2 V). The output terminal of the first voltage comparison module 121 outputs a second comparison signal (a high level signal). The control module 111 outputs a high level to the control terminal Q1 of the control element Q according to the second comparison signal, and turns on the control element Q, so that the first starting current (2 A) in the starting circuit 200 can be doubled to obtain the second starting current (4 A) without affecting the second starting voltage required by the second starting stage of the display panel 2.

In conclusion, although the present disclosure is disclosed above with reference to preferred embodiments, the foregoing preferred embodiments are not intended to limit the present disclosure. A person of ordinary skill in the art may make various modifications and embellishments without departing from the spirit and scope of the present disclosure. Therefore, the protection scope of the present disclosure falls within the scope defined by the claims.

What is claimed is:

1. A driving circuit, comprising a protection circuit and a starting circuit, wherein
the protection circuit comprises:
a control element, comprising a control terminal, a first terminal, and a second terminal, wherein the control element is electrically connected to the starting circuit by the first terminal to receive a starting voltage in the starting circuit;
a control unit, configured to generate a control signal and generate an output voltage, wherein an output terminal of the control unit is electrically connected to the control terminal of the control element to transmit the control signal to the control element;
a transmission circuit, wherein an input terminal of the transmission circuit is electrically connected to the control unit to transmit the output voltage; and
at least one voltage comparison module, configured to compare the starting voltage with the output voltage and generate a comparison signal, wherein the voltage comparison module comprises a first input terminal, a second input terminal, and an output terminal, the first input terminal of the voltage comparison module is electrically connected to the second terminal of the control element to receive the starting voltage, the second input terminal of the voltage comparison module is electrically connected to an output terminal of the transmission circuit to receive the output voltage, and the output terminal of the voltage comparison module is electrically connected to an input terminal of the control unit to output the comparison signal to the control unit;
wherein the control unit comprises a control module configured to generate the control signal and a starting module configured to generate the output voltage;
an input terminal of the control module is electrically connected to the output terminal of the voltage comparison module, and an output terminal of the control module is electrically connected to the control terminal of the control element; and an input terminal of the starting module is electrically connected to the control module, and the input terminal of the transmission circuit is electrically connected to an output terminal of the starting module to transmit the output voltage;

wherein there are two voltage comparison modules: a first voltage comparison module and a second voltage comparison module;

a first input terminal of the second voltage comparison module is electrically connected to the output terminal of the starting module to receive the output voltage, and a second input terminal of the second voltage comparison module is electrically connected to a threshold voltage module to receive a threshold voltage; and a first input terminal of the first voltage comparison module is electrically connected to the second terminal of the control element to receive the starting voltage, a second input terminal of the first voltage comparison module is electrically connected to an output terminal of the second voltage comparison module by the transmission circuit, and an output terminal of the first voltage comparison module is electrically connected to the input terminal of the control module.

2. The driving circuit as claimed in claim 1, wherein the second terminal of the control element is connected in series to a sensing element, and one terminal of the sensing element away from the control element is grounded.

3. The driving circuit as claimed in claim 1, wherein
the transmission circuit comprises a first branch circuit and a second branch circuit, an input terminal of the first branch circuit and an input terminal of the second branch circuit are electrically connected to the output terminal of the second voltage comparison module respectively;

when the output voltage of the starting module is less than the threshold voltage, the second input terminal of the first voltage comparison module is electrically connected to the output terminal of the second voltage comparison module by the first branch circuit to receive a first branch voltage; and when the output voltage of the starting module is greater than the threshold voltage, the second input terminal of the first voltage comparison module is electrically connected to the output terminal of the second voltage comparison module by the second branch circuit to receive a second branch voltage.

4. The driving circuit as claimed in claim 3, wherein
the first branch circuit comprises a first switch, a first current source, and a first resistor connected in series, and one terminal of the first resistor away from the first current source is grounded; and the second branch circuit comprises a second switch, a second current source, and a second resistor connected in series, and one terminal of the second resistor away from the second current source is grounded.

5. The driving circuit as claimed in claim 1, wherein the voltage comparison module is a comparator.

6. The driving circuit as claimed in claim 1, wherein the starting circuit further comprises a filter module, the filter module comprises a capacitor and a filter resistor, one terminal of the capacitor is connected to an output terminal of the starting circuit, another terminal of the capacitor is grounded, one terminal of the filter resistor is connected to the output terminal of the starting circuit, and another terminal of the filter resistor is grounded.

7. A driving method, for a driving circuit comprising a protection circuit and a starting circuit, wherein
the protection circuit comprises:
a control element, comprising a control terminal, a first terminal, and a second terminal, wherein the control element is electrically connected to the starting circuit by the first terminal to receive a starting voltage in the starting circuit;

a control unit, configured to generate a control signal and generate an output voltage, wherein an output terminal of the control unit is electrically connected to the control terminal of the control element to transmit the control signal to the control element;

a transmission circuit, wherein an input terminal of the transmission circuit is electrically connected to the control unit to transmit the output voltage; and at least one voltage comparison module, configured to compare the starting voltage with the output voltage and generate a comparison signal, wherein the voltage comparison module comprises a first input terminal, a second input terminal, and an output terminal, the first input terminal of the voltage comparison module is electrically connected to the second terminal of the control element to receive the starting voltage, the second input terminal of the voltage comparison module is electrically connected to an output teminal of the transmission circuit to receive the output voltage, and the output terminal of the voltage comparison module is electrically connected to an input terminal of the control unit to output the comparison signal to the control unit;

wherein the driving method comprises:
in a first starting stage, outputting, by the control unit in the driving circuit a first output voltage to a voltage comparison module, and outputting, by a starting circuit, a first starting voltage to the voltage comparison module through a control element;

comparing, by the voltage comparison module, the first output voltage with the first starting voltage;

when the first starting voltage is greater than the first output voltage, outputting, by the voltage comparison module, a first comparison signal to the control unit, and disconnecting, by the control unit, an electrical connection between the control element and the starting circuit according to the first comparison signal; and in a second starting stage, outputting, by the control unit, a second output voltage to the voltage comparison module, wherein the second output voltage is greater than the first output voltage, and the second output voltage is less than a second starting voltage in the starting circuit, outputting, by the voltage comparison module, a second comparison signal to the control unit, and maintaining, by the control unit, the electrical connection between the control element and the starting circuit according to the second comparison signal.

8. The driving method as claimed in claim 7,
further comprising:
outputting the first output voltage to a second input terminal of the voltage comparison module when an output voltage outputted by the control unit is less than a threshold voltage; and outputting the second output voltage to the second input terminal of the voltage comparison module when the output voltage outputted by the control unit is greater than the threshold voltage.

9. The driving method as claimed in claim 8, wherein
a first voltage comparison module compares the first output voltage with the first starting voltage;
the first voltage comparison module compares the second output voltage with the second starting voltage; and
a second voltage comparison module compares the output voltage with the threshold voltage.

10. The driving method as claimed in claim 7, wherein a first starting current required by the starting circuit in the first starting stage is 50% of a second starting current required by the starting circuit in the second starting stage.

11. A display terminal, comprising a terminal body, a display panel, and a driving circuit, wherein the driving circuit comprises a protection circuit and a starting circuit, the protection circuit is connected to the starting circuit by a control element, an output terminal of the starting circuit is electrically connected to the display panel by a driving chip, and
the protection circuit comprises:
the control element, comprising a control terminal, a first terminal, and a second terminal, wherein the control element is electrically connected to the starting circuit by the first terminal to receive a starting voltage in the starting circuit;
a control unit, configured to generate a control signal and generate an output voltage, wherein an output terminal of the control unit is electrically connected to the control terminal of the control element to transmit the control signal to the control element;
a transmission circuit, wherein an input terminal of the transmission circuit is electrically connected to the control unit to transmit the output voltage; and
at least one voltage comparison module, configured to compare the starting voltage with the output voltage and generate a comparison signal, wherein the voltage comparison module comprises a first input terminal, a second input terminal, and an output terminal, the first input terminal of the voltage comparison module is electrically connected to the second terminal of the control element to receive the starting voltage, the second input terminal of the voltage comparison module is electrically connected to an output terminal of the transmission circuit to receive the output voltage, and the output terminal of the voltage comparison module is electrically connected to an input terminal of the control unit to output the comparison signal to the control unit;
wherein the control unit comprises a control module configured to generate the control signal and a starting module configured to generate the output voltage;
an input terminal of the control module is electrically connected to the output terminal of the voltage comparison module, and an output terminal of the control module is electrically connected to the control terminal of the control element; and
an input terminal of the starting module is electrically connected to the control module, and the input terminal of the transmission circuit is electrically connected to an output terminal of the starting module to transmit the output voltage;
wherein there are two voltage comparison modules: a first voltage comparison module and a second voltage comparison module;
a first input terminal of the second voltage comparison module is electrically connected to the output terminal of the starting module to receive the output voltage, and a second input terminal of the second voltage comparison module is electrically connected to a threshold voltage module to receive a threshold voltage; and
a first input terminal of the first voltage comparison module is electrically connected to the second terminal of the control element to receive the starting voltage, a second input terminal of the first voltage comparison module is electrically connected to an output terminal of the second voltage comparison module by the transmission circuit, and an output terminal of the first voltage comparison module is electrically connected to the input terminal of the control module.

12. The display terminal as claimed in claim 11, wherein the second terminal of the control element is connected in series to a sensing element, and one terminal of the sensing element away from the control element is grounded.

13. The display terminal as claimed in claim 11, wherein
the transmission circuit comprises a first branch circuit and a second branch circuit, an input terminal of the first branch circuit and an input terminal of the second branch circuit are electrically connected to the output terminal of the second voltage comparison module respectively;
when the output voltage of the starting module is less than the threshold voltage, the second input terminal of the first voltage comparison module is electrically connected to the output terminal of the second voltage comparison module by the first branch circuit to receive a first branch voltage; and
when the output voltage of the starting module is greater than the threshold voltage, the second input terminal of the first voltage comparison module is electrically connected to the output terminal of the second voltage comparison module by the second branch circuit to receive a second branch voltage.

14. The display terminal as claimed in claim 13, wherein
the first branch circuit comprises a first switch, a first current source, and a first resistor connected in series, and one terminal of the first resistor away from the first current source is grounded; and
the second branch circuit comprises a second switch, a second current source, and a second resistor connected in series, and one terminal of the second resistor away from the second current source is grounded.

15. The display terminal as claimed in claim 11, wherein the voltage comparison module is a comparator.

16. The display terminal as claimed in claim 11, wherein the starting circuit further comprises a filter module, the filter module comprises a capacitor and a filter resistor, one terminal of the capacitor is connected to an output terminal of the starting circuit, another terminal of the capacitor is grounded, one terminal of the filter resistor is connected to the output terminal of the starting circuit, and another terminal of the filter resistor is grounded.

* * * * *